US005216797A

United States Patent [19]

Hall

[11] Patent Number: 5,216,797

[45] Date of Patent: Jun. 8, 1993

[54] METHOD AND APPARATUS FOR DEBANDING A BALE

[75] Inventor: Richard W. Hall, Aberdeen, Wash.

[73] Assignee: R. Hall Manufacturing Inc., Aberdeen, Wash.

[21] Appl. No.: 731,430

[22] Filed: Jul. 17, 1991

[51] Int. Cl.[5] .................. B23P 19/00; B65B 69/00

[52] U.S. Cl. .................. 29/426.4; 29/564.3; 83/835; 83/909; 225/1; 225/93

[58] Field of Search .................. 83/835, 909; 29/564.3, 29/426.4, 33 R; 414/412; 242/100.1, 54 R; 408/152; 225/1, 93

[56] References Cited

U.S. PATENT DOCUMENTS

| | | | |
|---|---|---|---|
| 1,076,920 | 10/1913 | Sprecher . | |
| 1,291,669 | 1/1919 | Clark . | |
| 1,859,051 | 5/1932 | Richter . | |
| 1,956,429 | 4/1934 | Toothaker | 164/69 |
| 1,998,893 | 4/1935 | Cole et al. | 408/152 |
| 2,820,282 | 1/1958 | Schneider, Jr. | 83/909 |
| 2,839,258 | 6/1958 | Jacobson | 242/110.2 |
| 2,941,743 | 6/1960 | Cochrane et al. | 242/72 |
| 2,992,592 | 1/1960 | Kaltenbach | 242/68.2 |
| 3,006,565 | 10/1961 | Pelletier | 242/46.4 |
| 3,279,010 | 10/1966 | Misanchuk | 242/100.1 |
| 3,281,092 | 10/1966 | Schultz et al. | 242/72 |
| 4,553,312 | 11/1985 | Mitzel et al. | 83/909 |
| 5,052,876 | 10/1991 | Tateno et al. | 83/835 |
| 5,079,826 | 1/1992 | Ercums et al. | 29/564.3 |

*Primary Examiner*—Hien H. Phan

*Attorney, Agent, or Firm*—Garrison & Associates

[57] ABSTRACT

A bale debanding method and apparatus comprising a band breaking blade, a band winding mandrel and a mandrel cleaning plate are mounted to a frame. A support table is attached to the frame for receiving a waste paper bale that is held together by banding material. As the bale is moved past the band breaking blade, a band retention notch engages a band and by stretching it breaks the band. Once a band is broken, an extensible band catch extending out of the mandrel contacts the band and facilitates the band in being wound around the mandrel. Once all of the bands have been removed from the bale, the band catch is retracted to a position within the mandrel and a cleaning plate is moved axially along the mandrel sweeping the bands off a free end of the mandrel. This process is repeated to remove bands from other surfaces of the bale, thereby releasing the waste paper in preparation of processing.

10 Claims, 5 Drawing Sheets

FIG. 4
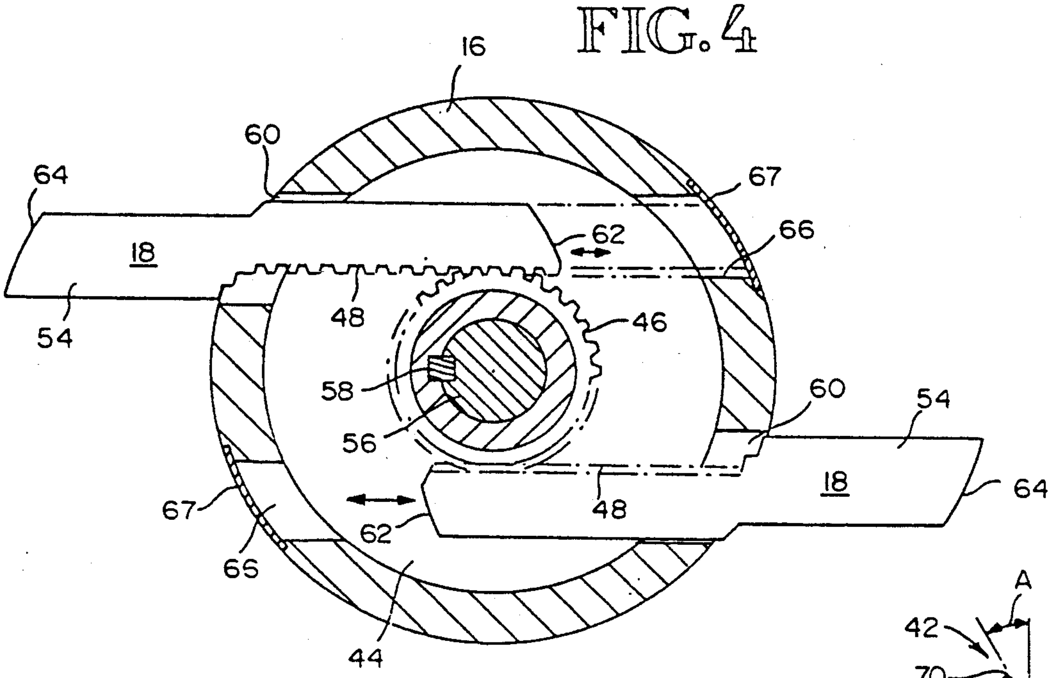
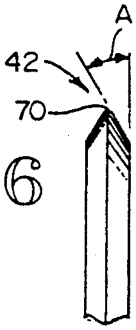
FIG. 6
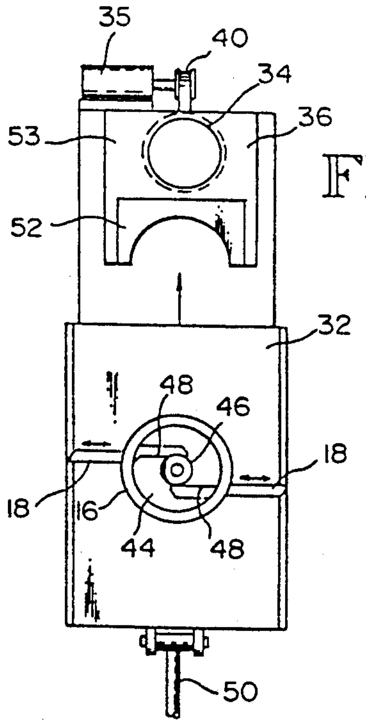
FIG. 3
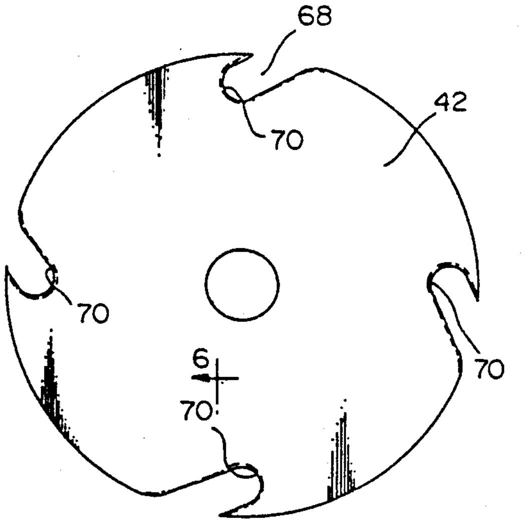
FIG. 5 6

FIG. 7
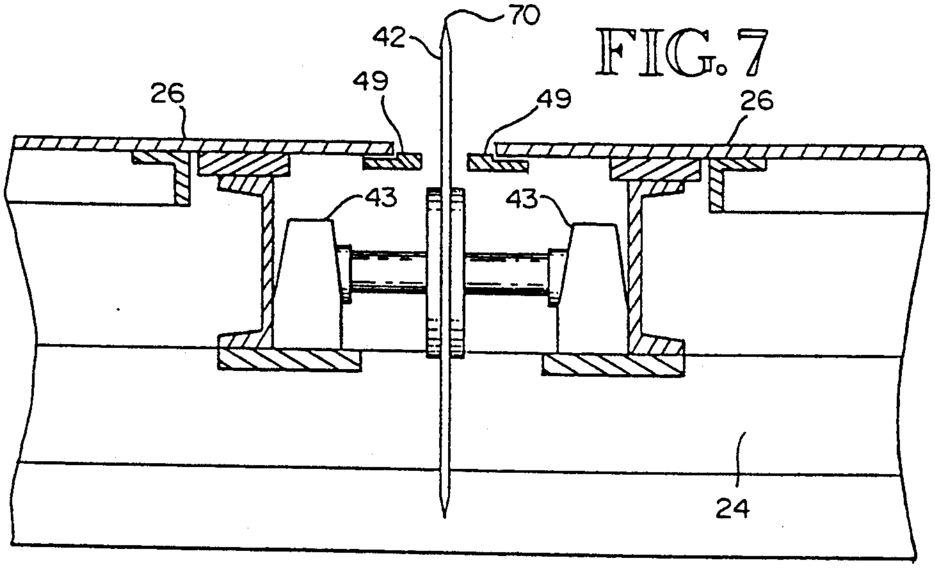
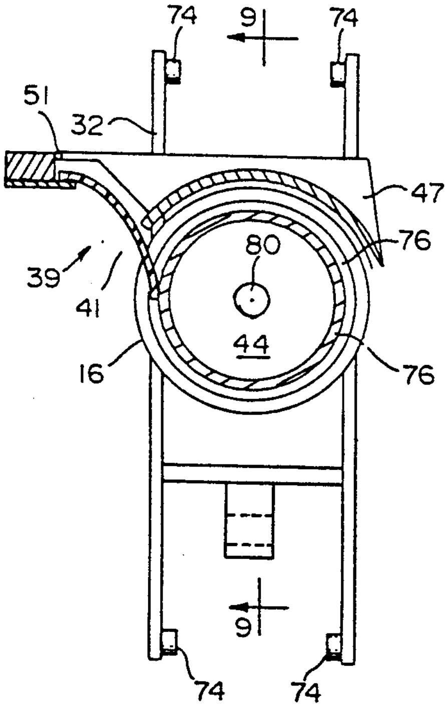
FIG. 8
FIG. 9
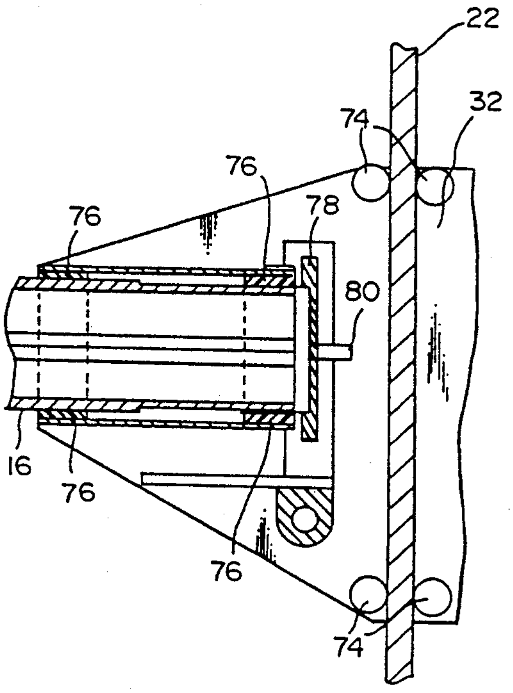

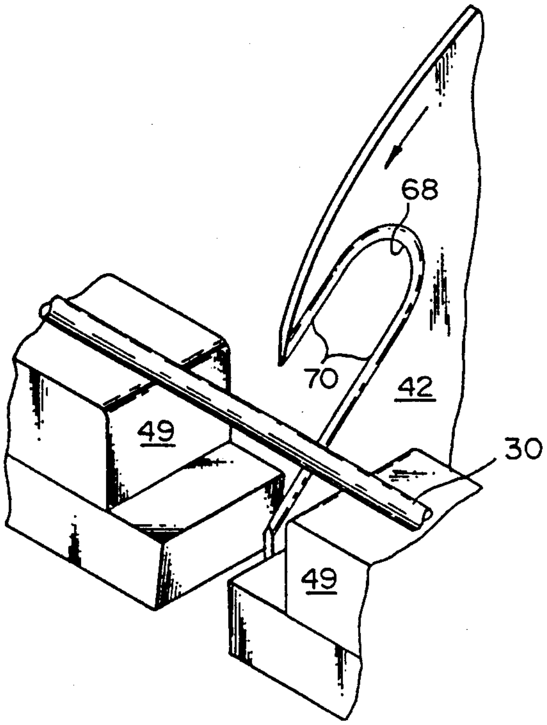
FIG. 12
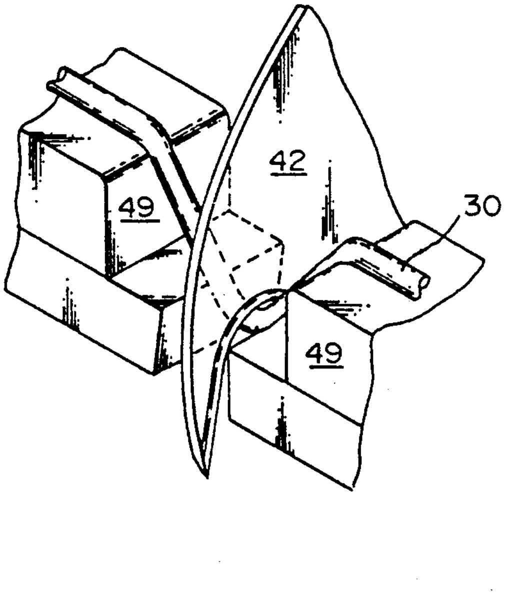
FIG. 13
FIG. 14
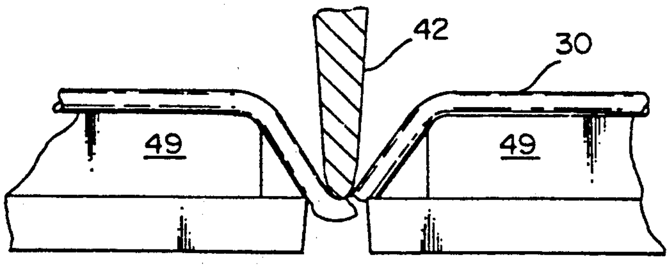

METHOD AND APPARATUS FOR DEBANDING A BALE

TECHNICAL FIELD

This invention generally relates to a machine for removing bands or wires which hold a bale of material together. More particularly, the invention relates to an apparatus for severing the bands or wires holding a bale of waste paper together, coiling the wires and depositing them into a collection bin.

BACKGROUND ART

The recycling of paper, and other materials derived from woodpulp, has been steadily increasing in volume creating a need for new equipment and methods of processing waste paper. While recycling waste paper is not a new idea, the benefits and attitudes toward recycling have dramatically increased in recent years. There has been, and continues to be, an increasing amount of waste paper being recycled. In order to reduce the costs and increase the efficiency of recycling this expanding amount of waste paper, new machines and methods are being developed where none existed before.

The use of certain types of re-pulping machinery requires that the banding holding a bale of wastepaper together be removed before processing begins. When bales of waste paper are brought into a recycling facility which uses such machinery, the wire or bands (usually metal) holding the bale together must be cut and removed from around the bales before the waste paper can enter the repulper. The re-pulping machinery is sensitive to the introduction of banding material, and will generally break down if any of the wire or banding material is mixed in with the waste paper.

Since the bands holding a bale of waste paper together are highly stressed when they are applied, it is hazardous for a worker to merely cut the band with a pair of wire cutters. In addition, once the bands have been cut, the waste paper tends to expand quickly, thereby making it difficult to retrieve the bands.

Another problem associated with debanding the waste paper bales is how to reduce the space occupied by the bands once they are removed and then placing the banding material into containers so that they too may be recycled.

Accordingly, there is a need for a method and apparatus which can be used to safely remove the bands from waste paper bales while insuring that all of the bands are removed from the bale and that substantially all of the banding material is deposited in a convenient manner for a wire chopper to reduce the bands to small pieces of metal for storage in barrels. It is also desirable to have the waste paper bales debanded on a conveyor thereby allowing the waste paper bales to freely expand as they are introduced to the processing equipment.

DISCLOSURE OF THE INVENTION

The bale debanding device of the present invention comprises a frame having vertical and horizontal support members. A mandrel is rotatably supported by the vertical support member. The mandrel has an axially extending hollow inner portion and an exterior surface. There is at least one band catch opening extending from the hollow portion radially outwardly to the exterior surface. An extendable band catch having a retracted position and an extended position is mounted for reciprocating motion in a generally radial direction through the opening. In the retracted position the band catch is contained within the mandrel with no portion of the band catch extending radially outwardly of the exterior surface of the mandrel. In the extended position, the band catch has a band engaging portion which extends radially outwardly from the exterior surface of the mandrel. The band catch has an inner rack portion which reciprocates generally within the hollow portion of the mandrel. Contained within the hollow portion of the mandrel is an independently rotatable pinion gear which is in meshing contact with the rack portion of the band catch.

In a preferred embodiment, a drive motor rotates the mandrel by means of a drive train. Both the drive train and the mandrel are mounted for vertical movement along the frame.

In a preferred embodiment, a pair of band catches are extended in order to grasp wires containing a bale of waste paper, with the wires being wrapped around the mandrel. A protective hood, pivotally attached to the frame of the device, encloses the upper half of the mandrel to aid in the wrapping of wires or bands and decrease the risk of injury to persons in the area of operation. After the wires have been wrapped around the mandrel, the band catches are retracted to a position within the mandrel, the protective hood is pivoted away from the mandrel and the mandrel is caused to elevate until it reaches a cleaning plate support member having a mandrel cleaning plate. The mandrel cleaning plate having a portion that fits closely around a portion of the mandrel is reciprocated in an axial direction along the mandrels axis of rotation, thereby sliding the wires off an open end of the mandrel.

In a preferred embodiment, a wire cutter comprising a circular blade having at least one band retainer notch formed by a portion of the blade being removed in an radially inwardly direction thereby allowing a wire to be gripped by the blade and stretched until the wire or band breaks.

In preferred form, a method of using the debanding apparatus comprises the steps of placing a mandrel in a position for vertical movement along a face of a waste paper bale for removing the bands therefrom, and providing a second step wherein said mandrel is moved to a position adjacent the top surface of said waste paper bale and having the waste paper bale move in a horizontal direction beneath the mandrel while the band catches remove the bands from the waste paper bale. After removal of the bands, the band catches are retracted to within the mandrel, a protective hood pivots away from the mandrel, and the cleaning plate sweeps the bands off the free end of the mandrel.

BRIEF DESCRIPTION OF THE DRAWINGS

In the drawings, unless otherwise noted, like reference numerals designate like parts throughout the several views, and:

FIG. 3 is a partial end view showing the mandrel with a pair of band catches extended and the top portion of a linear actuator for providing vertical movement;

FIG. 4 is an enlarged sectional view taken substantially along line 4—4 of FIG. 2, showing a pair of band catches in an extended position with one catch shown in a retracted position in phantom;

FIG. 5 is an enlarged view showing the preferred embodiment of a band breaking blade showing band retention notch;

FIG. 6 is an enlarged edge view taken substantially along line 6—6 in FIG. 5, showing a portion of a band retainer notch;

FIG. 7 is an enlarged elevational view in partial section showing the band breaking blade and support bearings;

FIG. 8 is an enlarged sectional end view taken substantially along line 8—8 of FIG. 2, showing a portion of a mandrel and a support carriage with a pressure flap and a hood also shown;

FIG. 9 is a view taken substantially along line 9—9 in FIG. 8 showing the mandrel support carriage and a end portion of the mandrel with the protective hood pivots away from the mandrel;

FIG. 12 shows an enlarged perspective view of the band breaking blade before engaging a wire spanning an anvil;

FIG. 13 shows an enlarged perspective view of the band breaking blade as a notch engages, stretches, and begins to break a wire spanning the anvil;

FIG. 14 is a partial cross sectional view of FIG. 13 highlighting the initial stretch and breakage of the wires spanning the anvil.

BEST MODE FOR CARRYING OUT THE INVENTION

Figure 1:
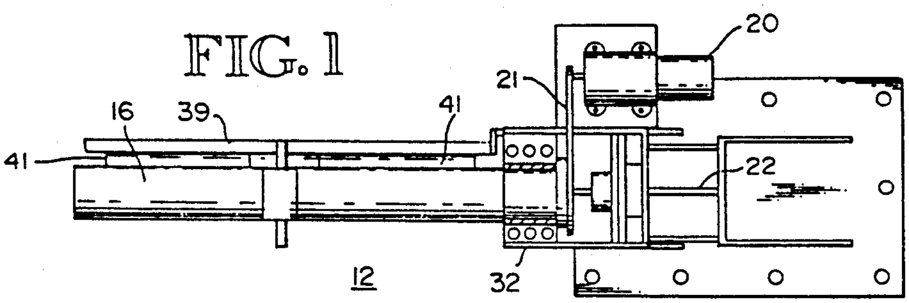
FIG. 1 is a partial plan view showing an upper portion of a debanding device including a frame and a mandrel.
Figure 2:
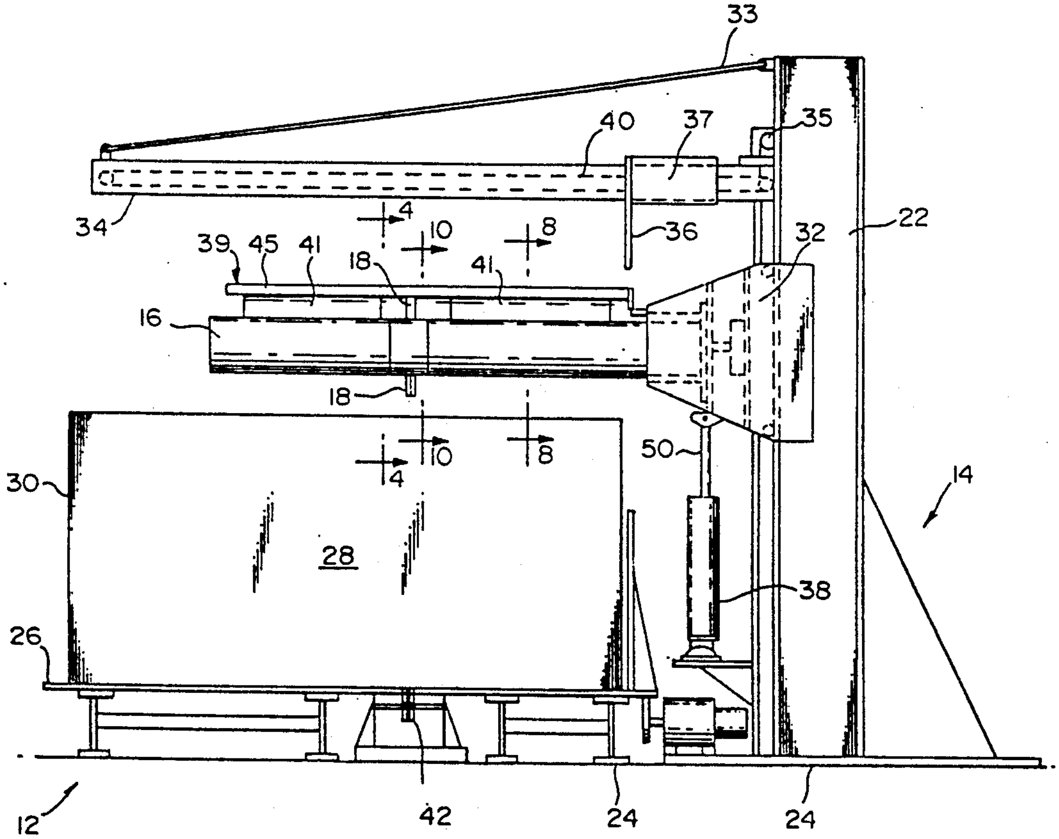
FIG. 2 is an elevational view of the debanding device with portions thereof shown in phantom.

Referring now to the drawings, and first to FIGS. 1 and 2, a debanding device 12 is shown to have a frame 14 on which a mandrel 16 is rotatably mounted. Mandrel 16 includes a pair of reciprocating band catches 18. The mandrel 16 is rotated by a drive motor 20 via a transmission chain 21.

Referring now to FIG. 2, frame 14 includes a vertical support 22 and a horizontal support 24. A bale receiving table 26 is in turn supported by horizontal support 24. A bale 28 of waste paper is supported by table 26 during debanding. The bale 28 generally has steel bands 30 or the like encircling it, usually in one direction and sometimes in two directions. The mandrel 16 is supported by a mandrel support member 32 (see FIGS. 8 and 9) which is mounted for vertical movement along vertical support 22. A linear motor or hydraulic cylinder 38 and piston rod 50 positions mandrel support member 32 along vertical support 22.

A cleaning plate support member 34 is supported by vertical support 22 at a location above the mandrel support 32. Cleaning plate support member 34 is further supported by brace 33. A cleaning plate 36 is mounted for reciprocating motion axially along cleaning plate support member 34. Cleaning plate 36 is driven by a motor 35 and a chain 40. In preferred form, the cleaning plate 36 includes a tubular portion 37 which is in sliding engagement with cleaning plate support member 34, wing any suitable mounting means such as rollers.

As shown in FIG. 2, a pressure flap assembly 39 is shown which includes a pair of flexible pressure flaps 41, and is supported by frame member 45 which is attached to mandrel support 32. Flexible pressure flaps 41 contact the mandrel 16 in such a manner as to aid in holding wires or bands 30 in place on the mandrel 16. Frame member 45 is adjustable such that the pressure applied by pressure flaps 41 against mandrel 16 is adjustable by repositioning frame member 45. Typical pressure flap 41 engagement with mandrel 16 is shown in FIG. 8 Also attached to frame member 45, as shown in FIG. 8, is a hood 47 which is hingedly attached to frame member 45 at point 51. Hood 47 fits closely over mandrel 16 aiding in the wrapping or winding of wires 30 around mandrel 16. In addition, end plates (not shown) may be added to the ends of hood 47, preferably made of plastic material, and engaging mandrel 16 to further aid in the winding of wires 30. Hood 47 pivots on frame member 45 in order to swing out of the way of cleaning plate 36.

A wire or band breaking blade 42 is mounted for rotatable motion on horizontal support 24 using a pair of bearing blocks 43 (see FIG. 7). As shown in FIG. 7, band breaking blade 42 is positioned to rotate through an anvil 49 which is made of a hardened steel, e.g., ASTRALOY (trademark) which aids in the breaking of bands 30, as further described below.

Referring now to FIG. 3, it is shown that the mandrel 16 includes a hollow portion 44 wherein a pinion gear 46 is located. Pinion gear 46 drives band catches 18 from retracted to extended positions by engaging a rack portion 48 of the band catches 18 (as shown in FIG. 4). Mandrel support member 32 is positioned vertically by the piston rod 50 of a linear actuator or hydraulic cylinder 38. Cleaning plate 36 is positionable along cleaning plate support member 34 by motor 35 driving chain 40. The cleaning plate 36 may be made of any suitable material but is preferably a composite of ultra-high molecular-weight plastic portion 52 and metal portion 53.

Figure 10:
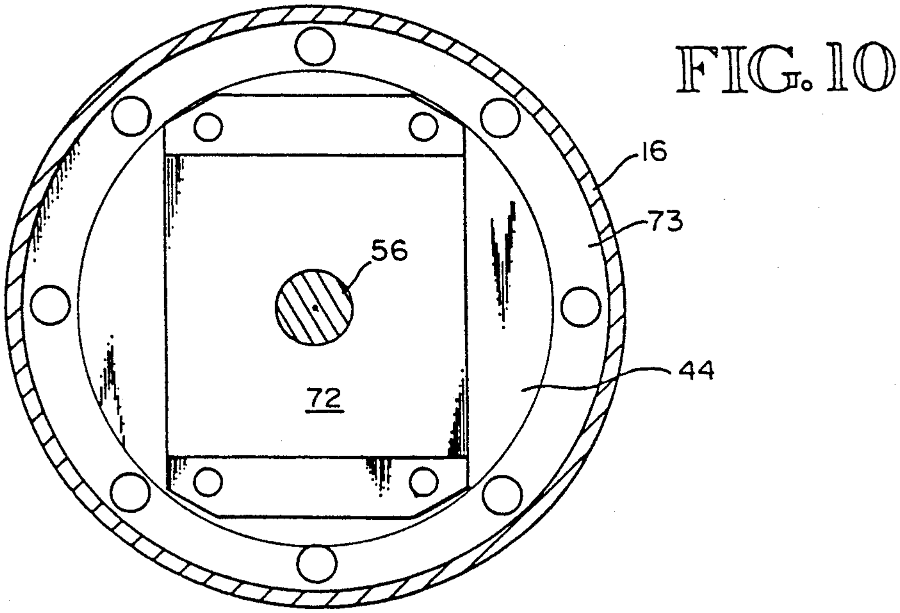
FIG. 10 is an enlarged end view taken substantially along line 10—10 in FIG. 2, showing a rotational motor within a mandrel mounting flange.
Figure 11:
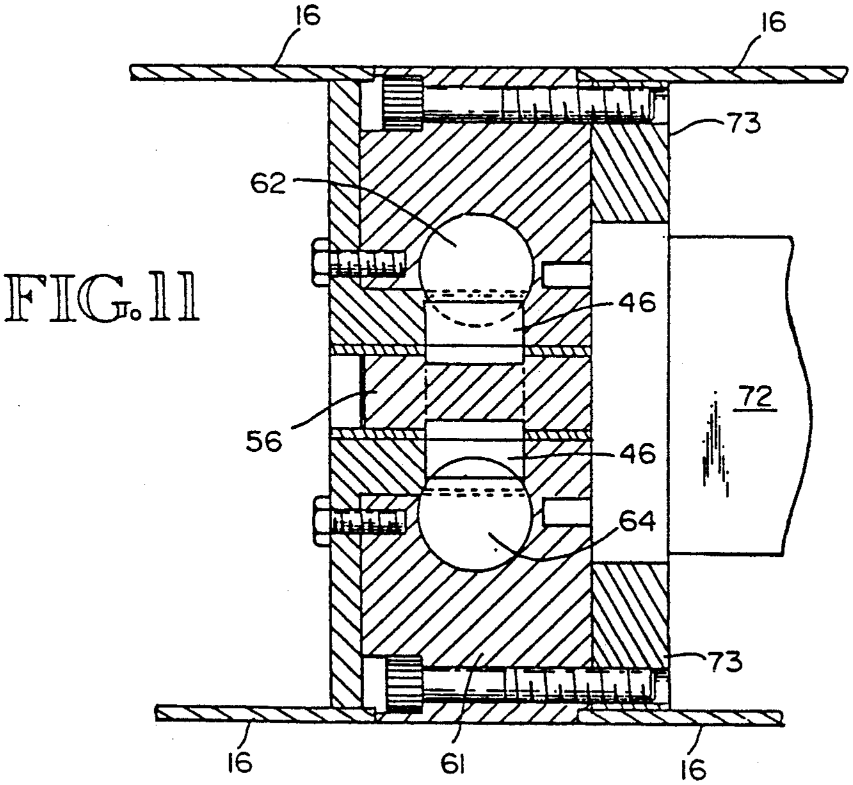
FIG. 11 is an enlarged partial sectional view showing a band catch hub and mounting with a rotary motor attached thereto.

Referring now to FIG. 4, mandrel 16 is shown in cross- section while band catches 18 are shown in elevation. Each band catch 18 includes a protruding portion 54 and a rack portion 48. The rack portion 48 of each catch 18 is in meshing engagement with pinion 46. Pinion 46 is driven by pinion shaft 56 through key member 58. Each band catch 18 extends through an opening 60 in mandrel 16. Openings 60 extend generally radially through mandrel 16, however these openings are spaced sufficiently off-center to allow pinion 46 to be placed between the pair of rack portions 48. In preferred form, the band catches 18 and pinion 46 are carried by a band catch disk 61, as shown in FIG. 11. The band catch disk 61 is machined from a solid disk of material and includes any suitable method of mounting it to a middle portion of the mandrel 16, such as by bolting to a flange 73 (see FIG. 10). Also shown in FIG. 10 is how hydraulic rotary actuator 72 fits within the mandrel's hollow portion 44. Each band catch 18 includes a rack end 62 and an outer end 64. Mandrel 16 includes a cavity 66 for receiving rack end 62 of band catch 18 when the band catch is in its retracted position. A cover plate 67 covers cavity 66.

Referring now to FIG. 5, band breaking blade 42 is shown. Band breaking blade 42, which is preferably made of ASTRALOY (trademark) that is heated to approximately 1,500 (1,600 being preferred) degrees fahrenheit and air-cooled after at least one band retaining notch 68 has been formed therein, and in preferred form includes four band retaining notches 68. The entire edge of band breaking blade 42 is also tapered as indicated in FIG. 6 at A to 30, before being heat-treated. Band retaining notches 68 are preferably sharpened, as indicated in FIG. 6, so as to have a relatively sharp edge 70, somewhat centered within blade 42. Edge 70 facilitates breaking of a band 30 and reduces the torque required to rotate band breaking blade 42.

Turning to FIG. 7, anvil 49, aids band breaking blade 42 in breaking bands 30 by providing notch 68 a solid surface that holds band 30 in place, preventing it from stretching.

In order to more fully understand the invention, the following is a description of the method of using the apparatus. A paste paper bale 28, which may be of any practical dimension, is conveyed by conventional conveying means to a position on support table 26. Support table 26 is slidable on plastic strips or any other suitable bearing support method, such that bale 28 can be moved progressively under mandrel 16. Table 26 is driven by use of a chain drive system. Mandrel 16 is rotated by motor 20, at a preferred rate of rotation of eighteen rpm and band catches 18 are moved to their extended position by rotating pinion 46. As shown in FIG. 11, a hydraulic rotary actuator 72 is preferred which has closed center locking valves such that it rotates until the hydraulic pressure is stopped, at which point the valves lock in place holding the shaft 56 in place. When hydraulic pressure is applied to rotate the shaft 56 in the reverse direction, the valves release and the shaft is rotated thereby retracting the catches 18. A double hydraulic hose arrangement passes through a rotating union 80 at the driven end of the mandrel 16.

After band catches 18 have attained their extended position, mandrel 16 is lowered by hydraulic cylinder 38 and piston rod 50 to a position adjacent bale 28. Referring to FIGS. 8 and 9, mandrel 16 is supported for rotation by mandrel support member 32 that is mounted to vertical support 22 using cam wheels 74 or the like which are capable of handling very high loads. The mandrel 16 is rotatably mounted at its drive end in a pair of ultra-high-molecular-weight or similar bearings 76. Mounted on the end of mandrel 16 is a sprocket 78 for a chain drive system.

The band breaking blade 42 is rotated by a hydraulic motor (not shown) at a rotational speed below 100 rpm and preferably at four to ten rpm through a chain driven transmission. Bale 28 is moved by table 26 toward mandrel 16 and blade 42. As the bale 28 moves over band breaking blade 42, which preferably rotates toward the approaching bale so as to pull down on a wire caught by notch 68, a first band 30 is engaged by band breaking notch 68 (see FIG. 12) and as the blade 42 rotates, band 30 is broken (see FIGS. 13 and 14). As bale 28 continues to move, one of the band catches 18 engages the previously broken band 30. Band 30 is then wrapped around mandrel 16 since it is held thereto by band catch 18. Band catch 18 is preferably rotated for a climbing cut, or, i.e., rotated toward and downwardly into the approaching bale 28.

Bale 28 continues to move through the apparatus until all of the bands 30 or wires are removed from one surface of the bale. After the bands 30 from one surface of the bale 28 have been removed, protective hood 47 is caused to pivot away from mandrel 16, thereby exposing the top portion of mandrel 16 to facilitate the removal of bands or wires 30. Then, mandrel 16 is preferably extended to a position above the bale by hydraulic cylinder 38 and piston rod 50, and is raised until cleaning plate 36 is adjacent mandrel 16. The next step is to retract band catches 18 by reversing the direction of rotation of pinion 56. After catches 18 have been retreated to their retracted position within mandrel 16, cleaning plate 36 is drawn toward the free end of mandrel 16, thereby removing the wires or bands wrapped around the mandrel. Mandrel 16 may continue to rotate during this step or may be stopped. Cleaning plate 36 is then returned to its initial position.

In order to remove bands 30 from other surfaces of the bale 28, the bale may either be repositioned and moved through the debanding apparatus as described above or a second debanding apparatus may be used wherein the mandrel 16 and the band breaking blade 42 are each mounted to a linear actuator capable of moving the mandrel and the blade over a different surface of bale 28, until all of the bands 30 have been removed from the bale 28.

From the foregoing, there is further modifications, component arrangements, and modes of utilization of the invention which will be apparent to those skilled in the art to which the invention is addressed. The scope of protection is not to be limited by the details of the embodiments which have been illustrated and described. Rather, the scope of protection is to be determined by the appended claims, interpreted in accordance with the established rules of patent claim interpretation, including the doctrine of equivalence.

I claim:

1. A method for removing bands holding a bale together comprising the steps of:

a) positioning a bale of material having bands to be removed onto a bale receiving table;

b) extending band catches outwardly of an exterior surface of a mandrel, rotating said mandrel and moving said mandrel and bale close enough together such that while said band catches begin engaging a band, c) winding said band around said mandrel by rotating said mandrel and said band catches after said band is broken;

d) repeating steps a) through c) until it is desired to remove said bands; and e) removing said bands from said mandrel by exposing said mandrel, moving said mandrel into contact with a cleaning plate, and axially reciprocating said cleaning plate along said mandrel after said band catches have been retracted.

2. A bale debanding device adapted to remove bands from a bale, said debanding device comprising:

an axially rotatable mandrel supported by a vertical support, said mandrel having an interior chamber and an exterior surface, and at least one band catch opening extending from said chamber to said exterior surface;

at least one extendable band catch having a retracted position within said chamber, and an extended position, said band catch having a band engaging portion extending generally radially outwardly from said exterior surface of said mandrel when in said extended position, and a rack portion which reciprocates within said chamber of said mandrel; and an independently rotatable pinion gear in meshing contact with said rack portion wherein said pinion gear is driven by a rotary actuator thereby controlling the extension and retraction of said at least one band catch independent of the rotation of the mandrel.

3. A debanding device according to claim 2, wherein a drive motor rotates set mandrel via a drive train, and said rotary actuator controls the extension and retraction of said at least one band catch.

4. A debanding device according to claim 3, wherein a pressure flap assembly, including at least one flexible pressure flap, is positioned such that said at least on fl is in band engaging contact with said mandrel.

5. A debanding device according to claim 4, wherein a cleaning plate is shaped to closely fit around a portion of said mandrel and said plate is mounted for axial movement along said mandrel, said plate being axially driven to remove said bands off said mandrel.

6. A debanding device according to claim 2, wherein a pressure flap assembly, including at least one flexible pressure flap, is positioned such that said at least one flap is in band engaging contact with said mandrel.

7. A debanding device according to claim 2, wherein a cleaning plate is shaped to closely fit around a portion of said mandrel and said plate is mounted for axial movement along said mandrel, said plate being axially driven to remove said bands off said mandrel.

8. A debanding device according to claim 2, wherein a pressure flap assembly, including at least one flexible pressure flap, is positioned such that said at least one flap is band engaging contact with said mandrel; and a cleaning plate is shaped to closely fit around a portion of said mandrel and said plate is mounted for axial movement along said mandrel, said plate being axially driven to remove said bands off said mandrel.

9. A bale debanding device adapted to remove bands from a bale, said debanding device comprising:

an axially rotatable mandrel supported by a vertical support, said mandrel having an interior chamber and an exterior surface, and at least one band catch opening extending from said chamber to said exterior surface;

at least one extendable band catch having a retracted position within said chamber, and an extended position, said band catch having a band engaging portion extending generally radially outwardly from said exterior surface of said mandrel when in said extended position, and a rack portion which reciprocates within said chamber of said mandrel; and an independently rotatable pinion gear in meshing contact with said rack portion wherein said pinion gear is driven by a rotary actuator thereby controlling the extension and retraction of said at least one band catch independent of the rotation of the mandrel; and a band severing blade, said blade having at least one band retention notch formed in an edge portion of said blade, said retention notch shaped to catch and retain said bands, generally one band at a time, when said blade is rotated and said bale is moved laterally over said rotating blade.

10. A bale debanding device according to claim 9, wherein a cleaning plate is shaped to closely fit around a portion of said mandrel and said plate is mounted for axial movement along said mandrel, said plate being axially driven to remove said bands off said mandrel; and an anvil having a slot therein to allow said blade to pass therethrough, said anvil aiding said blade in breaking said band by reducing stretching of the band when acted on by said blade.

* * * * *